United States Patent [19]

Suzuki

[11] 3,851,239

[45] Nov. 26, 1974

[54] HIGH VOLTAGE D.C. SUPPLY CIRCUIT

[75] Inventor: Masanari Suzuki, Yokohama, Japan

[73] Assignee: Kabushiki Kaisha Ricoh, Tokyo, Japan

[22] Filed: July 19, 1972

[21] Appl. No.: 273,153

Related U.S. Application Data

[63] Continuation-in-part of Ser. No. 821,701, May 5, 1969, which is continuation-in-part of Ser. No. 115,038, Feb. 12, 1971.

[52] U.S. Cl............................ 321/11, 321/2, 321/44, 315/209 CD, 323/48
[51] Int. Cl. ............................................ H02m 1/18
[58] Field of Search ............... 321/2, 11, 12, 43, 94; 315/209 CD; 323/45, 48

[56] References Cited
UNITED STATES PATENTS

| | | | |
|---|---|---|---|
| 2,082,121 | 6/1937 | Rypinski | 323/45 X |
| 2,089,860 | 8/1937 | Rypinski | 323/48 |
| 2,131,758 | 10/1938 | Rypinski | 323/48 X |

Primary Examiner—William M. Shoop

[57] ABSTRACT

An improved high voltage supply for providing high d.c. output voltages from lower a.c. or d.c. voltages and which is particularly suitable for generating corona discharge voltages in electrographic copying machines. Two primary windings are utilized on a step up transformer and are connected such that primary currents due to counter emf transient effects substantially cancel each other within the transformer without adversely affecting other components such as a semiconductor switch used to pulse the primary current. A protective circuit is also provided on the primary side of the transformer for detecting abnormal operating conditions and for effectively de-activating the apparatus in response thereto. The output voltage is preferably taken from across a diode element rather than the usual capacitor to further increase the magnitude of the available d.c. output voltage.

17 Claims, 13 Drawing Figures

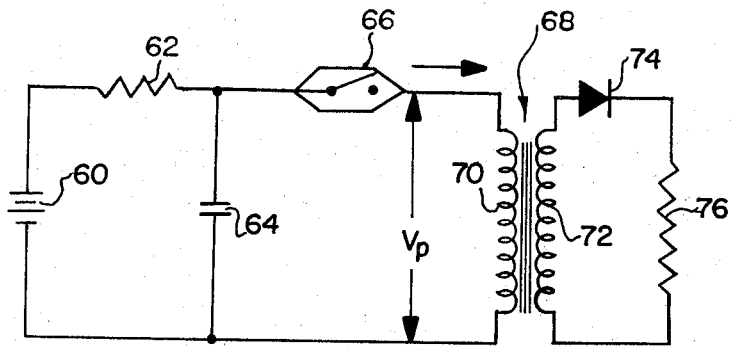
FIG.1
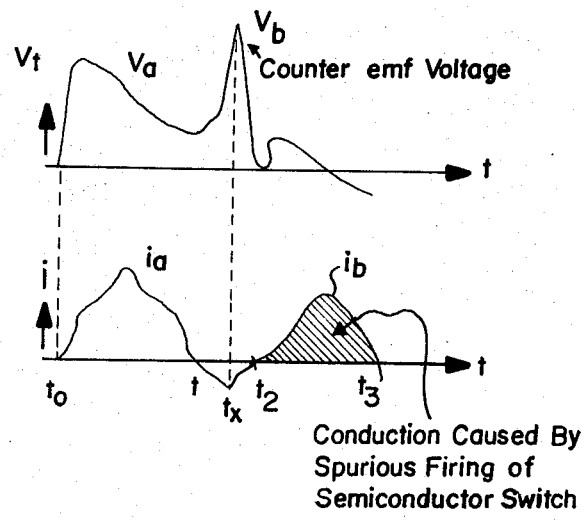
FIG.2
FIG.3
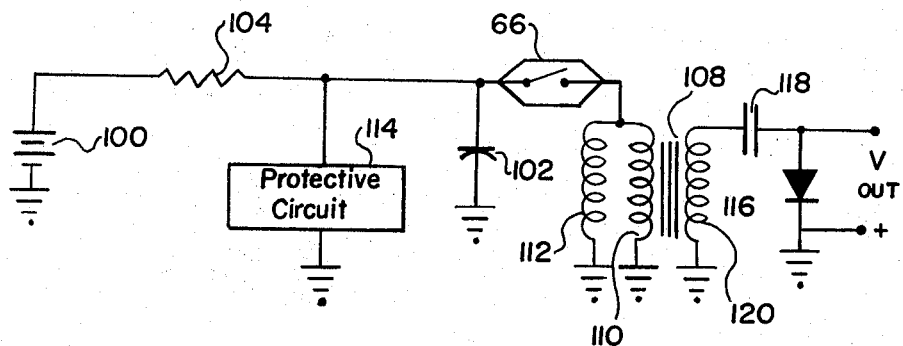

N Number of Operations Due to Abnormal Conditions

HIGH VOLTAGE D.C. SUPPLY CIRCUIT

This application is a continuation-in-part of my earlier copending applications Ser. No. 821,701, filed May 5, 1969 and Ser. No. 115,038 filed Feb. 12, 1971.

This invention relates generally to high voltage d.c. supply apparatus for supplying very high d.c. output voltages from lower d.c. or a.c. voltages.

More particularly, this invention relates to improvements in the customary apparatus of this nature.

One of the primary objects of this invention is to provide a power supply for an electrostatic charging device which is compact in size, efficient and economical in operation, safe and reliable, easy to manufacture and which generates a high output voltage.

For instance, it is an object of this invention to eliminate spurious transient primary switching operations that are often caused by counter emf voltages when a semiconductor switch is utilized. This improvement is achieved by providing a second or auxiliary primary winding on the transformer with both primary windings connected together to permit opposing counter emf currents in the two windings to cancel each other thus preventing high external counter emf voltages from causing spurious semiconductor switch operations.

Thus, this invention contemplates the prevention of excessive counter emf voltages induced in the primary winding of the transformer from influencing a semiconductor switching element while at the same time without reducing the efficiency of the transformer and without adding any expensive additional circuitry, thereby enabling the switching element to effectively operate at a higher frequency.

Another object of this invention is to provide means for automatically protecting the supply apparatus from abnormal operating conditions which may be caused by either effective short circuiting or disconnection of the load. The abnormal condition is sensed as a predetermined number of abnormal switching operations after which the input to a step up transformer is shunted to prevent overload or other damage to the circuit elements. This protective circuit may be fabricated or incorporated into the overall device at a very low cost.

Yet a further object of this invention is the provision of means for causing an increased output voltage. The rectified output voltage is taken from across a diode in a series diode-capacitor-power source circuit rather than from across the capacitor as is more usual. As will be more clearly shown below, this change in the placement of the output terminals produces a greatly increased output voltage because the voltage charged on the capacitor is superposed upon the power source voltage.

Using the teachings of this invention, a more reliable supply may be constructed for any given output voltage using a fewer number of transformer turns and other circuit elements may be rated at lower values. Thus, the cost of fabrication of the device of the present invention is remarkably reduced.

In the usual electrographic copying process, the required corona discharge current is 500 $\mu$A at the most so that a relatively low frequency supply may be used, as described above. But, in order to efficiently impart electrostatic charge to a sensitized sheet, it is preferable to use a high frequency and sharply shaped waveform pulse. According to the present invention, this desired result can be accomplished cheaply and reliably as discussed in more detail below.

When such a high frequency of operation is used with this invention, it is not necessary to increase the number of transformer turns, etc. in order to obtain a required inductance so that the transformer can be made compact in size, and at a reduced cost in addition to the other economies already mentioned.

A more complete understanding of this invention may be obtained from the following detailed description in conjunction with the accompanying drawings, of which:

FIGS. 1 and 2 are illustrations of a prior art circuit and of typical waveforms occurring therein, respectively;

FIG. 3 is a general schematic illustration of the improved circuit of this invention embodying all the disclosed improvements;

Figure 4:
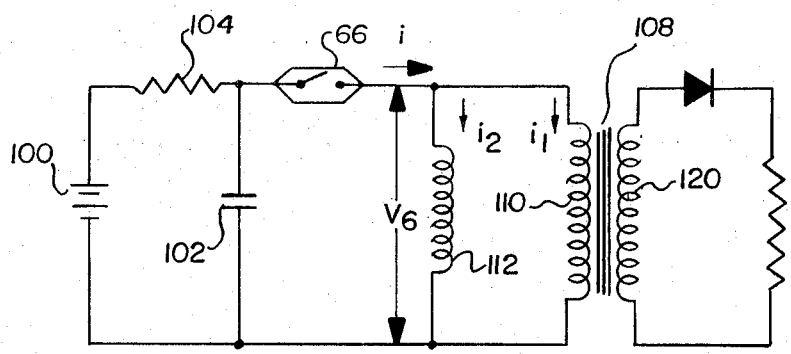
FIGS. 4 and 5 illustrate a circuit diagram and representative waveforms therein for use in explaining an improvement of the circuit shown in FIG. 3 whereby adverse counter emf effects are minimized.

A high d.c. voltage generating device of the prior art is illustrated in FIG. 1, wherein 60 designates a d.c. power source; 62 a resistor; 64 a capacitor; 66 a semiconductive switching element; 68 a transformer; 70 and 72, its primary and secondary windings respectively; 74 a rectifier element; and 76 a load.

The RC time-constant circuit for determining the operating frequency is made up of the resistor 62 and the capacitor 64. Upon actuation of the semiconductive switching element 66, a high d.c. voltage is induced in the secondary 72 of the transformer 68. It is advantageous to maintain a high coupling coefficient between the primary 70 and the secondary 72 of the transformer 68 so as to improve its efficiency. However, in order to transmit the pulsating power with a minimum loss, the number of primary winding turns must usually be quite large. Especially, when the voltage ratio of the transformer is high, these requirements for minimizing loss must be satisfied. However, when the inductance of the primary winding is increased as described above, the counter electromotive force produced when the semiconductor switching element is opened is increased proportionately so that it tends to be damaged by counter emf currents or to be spuriously switched to its conducting state in response to the counter emf transient voltage developed.

When the switching element 66 is closed at the point $t_o$ as shown in FIG. 2, and is then opened at $t_1$, the voltage $V_a$ is applied to the primary winding 70 of the transformer 68 so that a current $i_a$ as shown in FIG. 2 flows in the direction indicated by the arrow in FIG. 1. When the switching element 66 is opened at time $t_1$, a transient counter emf voltage peaks at a subsequent time $t_x$ due to the inductance of the primary winding so that the switching element 66 is caused to spuriously conduct even though it is desired that the switch be opened. Thus, the transient counter emf effects cause spurious switching thereby permitting the flow of a spurious current $i_b$ as shown in FIG. 2. If such spurious current flows, then the effective operating frequency of the switching element 66 is greatly reduced as is apparent. The current between the points $t_1$ and $t_2$ in FIG. 2 is that which flows during the recovery time of the switching element 66.

To overcome these problems, the transient counter emf voltage of the primary winding must be reduced or prevented from being applied to the switching element 66. In the former instance, the number of primary winding turns must be reduced so that there is an offsetting disadvantage in that the efficiency of the transformer 68 is inherently reduced. In the latter instance, a suitable circuit must be additionally connected in parallel or in series to the primary winding of the transformer 68 so that there is then the inherent disadvantage of increasing the cost and complexity of the device.

There is another disadvantage with a conventional circuit such as that shown in FIG. 1. Here, when a d.c. power source 60 is connected as shown, capacitor 64 is charged through resistor 62 until its charged voltage exceeds the breakdown or trigger voltage of a switching element 66. The switching element 66 is then effectively closed whereby a resulting pulse current $i$ flows through the primary winding 70 of a transformer 68. A stepped-up output pulse voltage is derived from the secondary winding 72 of the transformer 68.

However, when any large impedance change occurs in the secondary winding circuit, the function of the transformer is affected. For example, a corona or spark discharge within the transformer or other circuit elements may be produced by the short-circuit or removal of the load, a breakdown in a poor secondary winding insulation, etc. When this occurs, an abnormal voltage appears in the primary winding of the transformer 68 so that an overcurrent may flow through circuit elements on the primary side or an overvoltage may be applied to the secondary winding circuit. As a result, the switching element 66 may be erroneously opened or closed with an irregular time interval or, in some cases, the polarity of the voltage charged across the capacitor 64 may be reversed so that the pulse repetition rate as determined by the RC time constant may be varied thus interfering with normal circuit operation. When such conditions prevail, a current in excess of the rated current usually flows through the various circuit elements, to result in damage or breakdown as should be apparent.

A complete high voltage supply embodying all the improvements of this invention is shown schematically in FIG. 3. A brief description of this circuit will now be given; however, it should be apparent to those in the art that various portions of the improved circuit may be utilized separately if desired. Thus, each of the three areas of improvement will be separately discussed in more detail below.

The basic mode of operation of the FIG. 3 circuit is similar to that already discussed with respect to the prior art. Namely, a low voltage d.c. (or a.c.) source 100 charges capacitor 102 through resistor 104 until the charged voltage on capacitor 102 exceeds a trigger voltage for a semiconductor switch 106. At this time, the switch 106 is effectively closed whereupon capacitor 102 discharges through the primary of step-up transformer 108. The increased output voltage induced in the secondary is then rectified and output to a utilizing apparatus such as an electrographic copying machine.

However, as discussed in more detail below, the primary winding of transformer 108 has two windings, the usual "primary" winding 110 and an "auxiliary" winding 112 that are connected together such that counter emf currents cancel within transformer 108 without seriously affecting the switching operation of switch 106.

In addition, a protective circuit 114 is connected across capacitor 102. As discussed more fully below, this circuit effectively shunts source 100 through resistor 104 whenever abnormal operating conditions are detected to prevent damage or breakdown of other circuit components in these circumstances.

Furthermore, it should be noted that the output voltage $V_{out}$ is taken from across diode 116 rather than capacitor 118. In this manner the d.c. voltage charged on capacitor 118 is effectively added to that appearing across the secondary winding 120 so that the pulsating d.c. output $V_{out}$ is of a greater magnitude.

Referring to FIG. 4, the primary winding of the transformer comprises two parallel-connected windings. More specifically, in addition to the conventional primary winding 110, the additional winding 112 is wound around the same magnetic core. The former may be referred to as "the main primary winding" 110 and the latter as "the auxiliary primary winding" 112 whose diameter is smaller than that of the main primary winding. Illustratively, the diameter of the wire forming winding 110 is 0.5mm, while the diameter of the wire forming winding 112 is 0.2mm, so that the resistance ratio of the two windings is about 1:7, assuming the windings have the same number of turns. The two primary windings may be wound individually or may be in the form of a bifilar winding. The number of turns of the two windings preferably are equal to but may be slightly different from each other as should be apparent.

As is well known, the difference in wire sizes forming windings 110 and 112 account for a difference in their respective time constants resistances, and hence due to their similar inductances, the windings have different resistance to inductance ratios. For steady state a.c. conditions this difference in time constants allows a net current to flow through windings 110 and 112, the net current being coupled to winding 120. For transient back emf conditions though, the actual value of the inductances of windings 110 and 112 are substantially immaterial, since it is the characteristic response of the inductor to form a short circuit with respect to instantaneous current changes. Therefore, since windings 110 and 112 are oppositely wound, the transient back emf values developed cancel each other so that the transient current coupled to winding 120 is greatly reduced as compared with the prior art.

In order to explain the operation of the circuit in producing a net current in windings 110 and 112, it is apparent that the maximum current which will flow in each of the windings will differ. Thus, under steady state conditions in the above example the maximum current in the primary winding 110 will be about 7 times the maximum current in the winding 112, since the same voltage is applied to each winding. Due to the differences in resistance in the windings, with similar inductances, the windings have different time constants, so that upon the initial closing of the switching element 66, the current in the main primary winding 110 rises to its maximum value more rapidly than the current in the auxiliary primary winding 112 rises to its lower maximum value. Consequently, the slope of the increasing current as a function of time is also greater in the winding 110 than in the winding 112. Due to these differences in current flow and the primary windings, a net current is coupled to the secondary winding.

Figure 5:
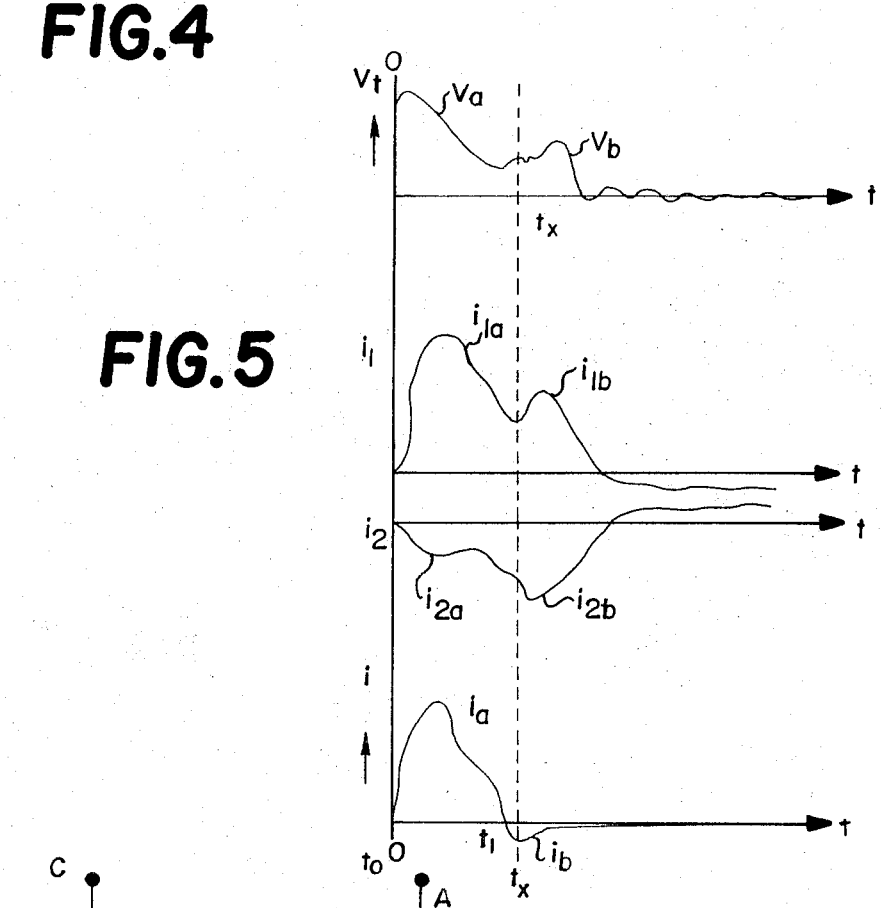

When the switching element 66 is closed at the point $t_o$ as shown in FIG. 5 a voltage $V_t$ is applied to the primary of the transformer 108 so that the currents $i_{1a}$ and $i_{2a}$ shown in FIG. 5 flow through the main and auxiliary primary windings 110 and 112; respectively. The resultant current $i_a$ is also shown in FIG. 5. When the switching element 66 is then opened at time $t_1$, a counter emf voltage $V_b$ is induced at a subsequent time $t_x$ while the currents flowing through the main and auxiliary primary windings 110 and 112 change to $i_{1b}$ and $i_{2b}$ while the resultant current becomes $_b$. It will now be appreciated that $V_b$ as shown in FIG. 5 is much smaller than $V_a$. This is, of course, a great improvement over the conventional situation as previously discussed with respect to FIG. 2.

The voltage and current waveforms shown in FIG. 5 were obtained by experiment with the circuit shown in FIG. 4. Current waveforms $i_1$ and $i_2$ are reversed because the magnitudes and phases of the counter emf voltages induced in the main and auxiliary primary windings 110 and 112 are different. That is, the windings are connected to insure that the counter emf currents cancel one another. Thus, energy transmission between windings 110 and 112 takes place efficiently without the relatively greater counter emf as shown in FIG. 2 reaching the terminals switching element 66.

When it is desired to have only the same degree of coupling as that of the conventional transformer having only one primary winding, the number of primary turns in windings 110 and 112 of the transformer may be reduced accordingly so that the counter emf voltages may be reduced even further.

Thus, according to the present invention, a high d.c. voltage generating device is provided without adverse transient counter emf effects by merely changing the arrangement of the primary transformer winding without reducing the efficiency of the transformer and adding without any additional expensive circuit elements.

Figure 6:
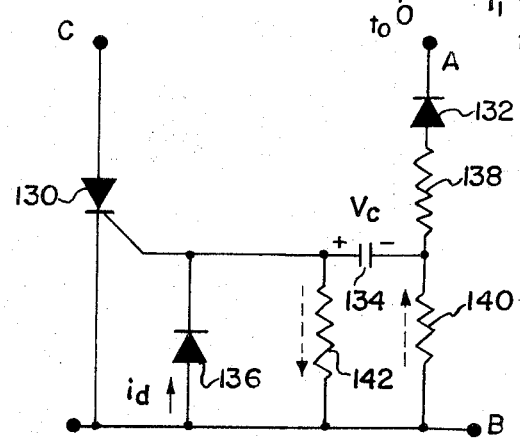
FIG. 6 is a circuit diagram of the protective circuit shown in FIG. 3.

Referring now to FIG. 6, the protective circuit 114 will be described. A silicon controlled rectifier 130 is turned on when a signal is applied between terminals A and B in a preselected direction. For instance, when the signal voltage $V_A - V_B$ is positive, the circuit is not activated because of the provision of a rectifier 132. When $V_B - V_A$ is positive, the capacitor 134 is charged with the polarity shown by the current $i_d$ passing through a rectifier 136. In this case, a time constant circuit having a time constant $\tau$ comprises the capacitor 134 and a resistor 138 with respect to the applied signal voltage. The SCR 130 is then triggered by the charged $V_c$ across the capacitor 134. The circuit for triggering the SCR 130 may be adjusted to a suitable sensitivity by the time constant $\tau = R_{138} \cdot C_{134}$. A resistor 140 is connected to the resistor 138 to prevent excess voltages in the circuit and to help provide a slow discharge path for capacitor 134. A resistor 142 is used to slowly discharge the capacitor 134 which is, of course, charged when an input voltage or external noise signal is applied, thereby preventing erratic operation of the SCR 130. Thus, the voltage $V_c$ is normally zero.

Figure 7:
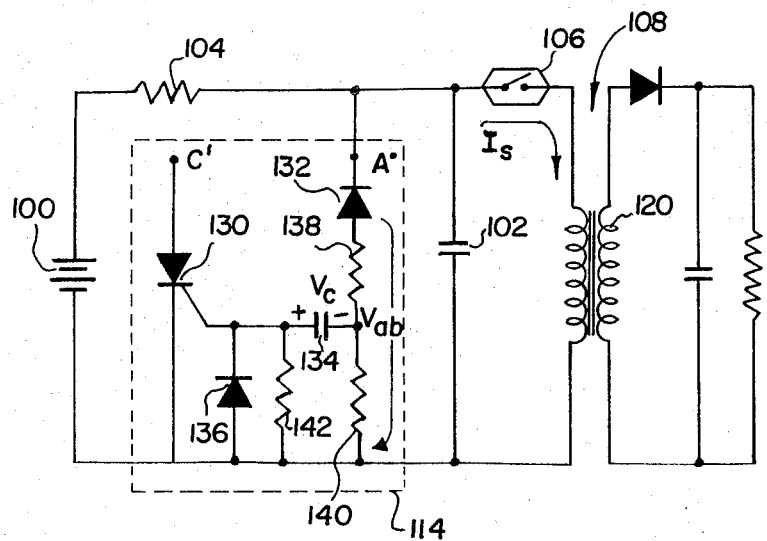
FIGS. 7 and 8 illustrate a complete high voltage d.c. supply schematic diagram and representative waveforms occurring therein for use in explaining the overall operation of the protective circuit detailed in FIG. 6.

A high d.c. voltage generating circuit incorporating the protective circuit shown in FIG. 6 is illustrated in FIG. 7. The protective circuit 114 is surrounded by the broken lines as shown. The same element parts are designated by the same reference numerals throughout FIGS. 6 and 7.

Figure 8:
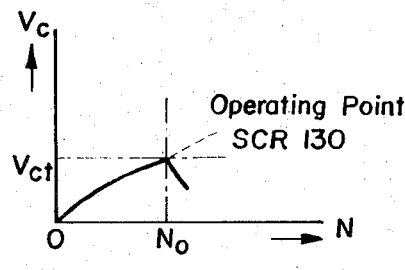

When the load is normal such that the circuit is operating under normal conditions, the capacitor 102 is periodically charged and discharged by the time-constant circuit consisting of the resistor 104 and the capacitor 102 and by the switching operation of the switching element 106 as previously discussed. In this case, the polarity of the charging of capacitor 102 is always constant and will not be reversed. However, when an abnormal load condition should occur (i.e., breakdown of transformer 108 or the load or removal of the load, etc.), the performance of the transformer 108 becomes quite oscillatory and a so-called "rebounding" phenomenon occurs in the primary of the transformer 108. Consequently, the capacitor 102 is charged with a reversed polarity as shown in FIG. 8. The transistion of the voltage and current shown in FIG. 7 are illustrated in FIG. 8. The reverse-polarity charging continues until the switching element 106 is opened, that is during the time interval from $t_o$ to $t_s$. The reverse-polarity voltage as a signal representing the occurrence of an abnormal condition is then fed into the protective circuit through the rectifier 132 from the point A'. The power source is then effectively shunted through resistor 104 by the closing of control means SCR 130 which closing may be interpreted as a control signal generated in response to the detection of said reverse-polarity voltage. Because of the voltage drop across the resistor 104, the switching element 106 is stopped. Once the protective circuit is operated, the power source in the high d.c. voltage generating device is interrupted and the high voltage generating device remains de-activated until the broken element parts are repaired or replaced.

Alternatively, the point C' may not be connected to resistor 104, but, rather, a relay must be actuated by another power source so that the power source in the generating device may be interrupted or an alarming device may be actuated.

Figure 9:
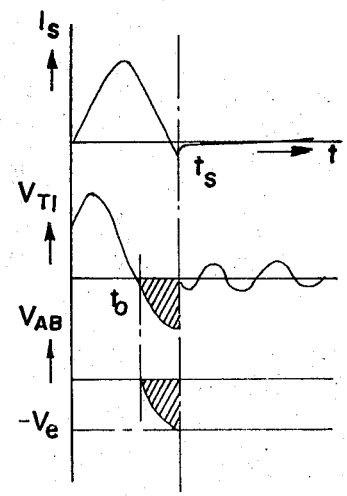
FIG. 9 is a graph for use in explaining the operation of the protective circuit shown in FIG. 6.

As described above, the operating point and sensitivity of the protective circuit may be suitably adjusted by $\tau = R_{138} \cdot C_{134}$. This is illustrated in more detail in FIG. 9. The voltage $V_c$ across the capacitor 134 is increased as the number N of switching operations of the switching element 106 due to the abnormal conditions caused by the short-circuit or the like of the load is increased. At a number $N_o$, the voltage $V_c$ reaches to the gate trigger voltage $V_{gt}$ of the SCR 130, thereby causing it to conduct. The magnitudes of the resistors 140 and 142 are so high that the gate triggering current $I_{gt}$ of the SCR 130 is not adversely affected. The rectifier 136 protects the SCR 130 from reverse voltages exceeding its rated peak reverse voltage.

Thus, according to this invention, an abnormal voltage induced in the primary of the transformer may be detected and the circuit elements may be automatically protected from excess voltages or currents.

Figure 10:
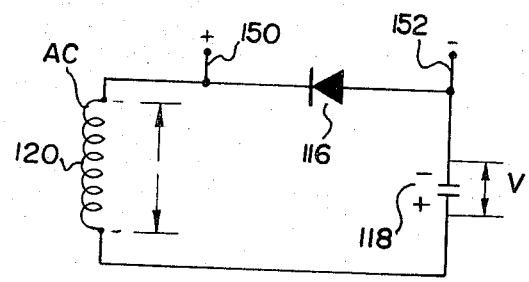
FIGS. 10 and 11 illustrate another supply circuit diagram and a representative waveform occurring therein for use in explaining the improved output circuit shown in FIG. 3.
Figure 11:
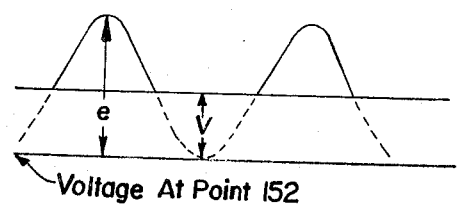

Referring now to FIG. 10 showing another embodiment of this invention, an output rectifier element 116 and an output capacitor 118 are connected in series with a high-voltage a.c. power source such as secondary winding 120, and the output terminals 150 and 152 are provided on the opposite sides of the rectifier element 116 respectively. Reference character $V_{out}$ designates the voltage across the a.c. power source 120 and $V_{118}$, the charging voltage of the capacitor 118. This circuit is similar to the conventional half-wave rectifier circuit except that the output terminals 150 and 152 are provided on the opposite sides of the rectifier element 116. However, as shown in FIG. 11 the half-wave of a.c. which is interrupted by the rectifier element and is not utilized in the conventional rectifier circuit can be superposed upon the charging voltage $V_{118}$ of the capacitor 118 so that a full-wave of the high voltage power source is utilized.

Figure 12:
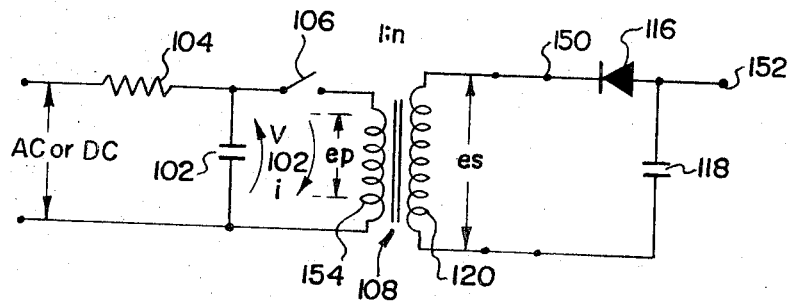
FIGS. 12 and 13 illustrate yet another supply circuit diagram and representative waveforms occurring therein for use in explaining the improved output circuit shown in FIG. 3.

Referring now to FIG. 12, a switching element 106 and a capacitor 102 are connected in series to the primary 154 of a transformer 108. A d.c. or a.c. power source is connected to capacitor 102 through resistor 104. To the secondary 120 of the transformer 108 is connected a half-wave rectifier and smoothing circuit comprising a rectifier element 116 a capacitor 118.

When the switching element 106 is opened and closed at a rapid rate, a pulse current having a high repetitive frequency and sharp rise and fall characteristics flows through primary 154 so that high frequency, high-voltage pulses are generated in the secondary 120.

Figure 13:
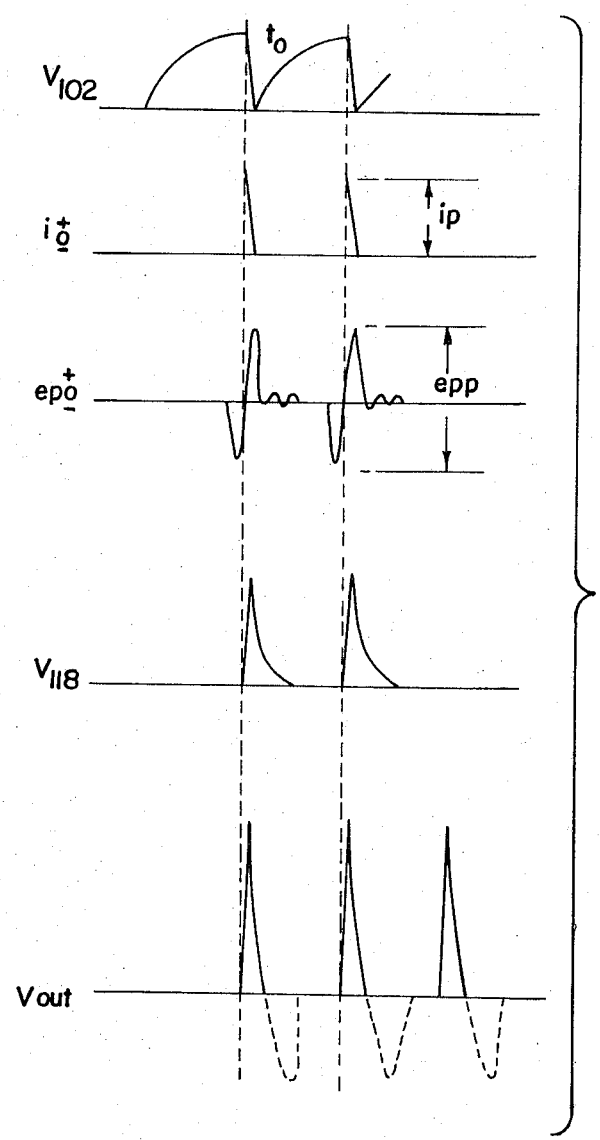

FIG. 13 shows the waveforms of voltages and currents at several points in the power supply circuit shown in FIG. 12. The turn ratio of the transformer 108 is 1:n and the counter emf voltage $epp$ in the primary 154 is given by the relation $$epp = i_p \sqrt{L/C_A}$$

where $L$ = inductance of the primary 154 $C_A$ = distributed capacity of primary 154.

In FIG. 13, $V_{102}$ is the waveform of voltage across the capacitor C. $t_0$ shows the time when the switching element 106 is closed and $i$, the pulse current flowing through the circuit when the switching element is closed while $i_p$, is the peak value. The reference character $ep$ designates the pulsating voltage across the primary 154. This voltage $e_p$ is then stepped up $n$ times, resulting in the voltage $e_s$ across the secondary 120. The voltage $e_s$ is rectified by the half-wave rectifier 116 and smoothed by the capacitor 118 so that the voltage whose wave-form is shown by $V_{118}$ is present across capacitor 118. The waveform of the voltage across diode 116 and output terminals 150, 152 by $V_{out}$. Thus, as shown, when the output is derived from across the diode 116, the voltage $V_{118}$ is effectively superposed with the secondary voltage $e_s$ pulses so that a very high output voltage is obtained. When such a high voltage is not required, the number of transformer winding turns may be reduced. The necessary capacity of the components may also be reduced so that this arrangement is especially advantageous when used as a charging device for electrographic copying equipment in which the current requirements are not high and which preferably comprise h.f. pulsating components.

While only a few embodiments of this invention have been particularly discussed, those skilled in the art will readily appreciate that many minor modifications could be made in the specifically described circuits without seriously affecting the desired mode of operation as discussed above. Accordingly, all such modifications are intended to be included within the scope of this disclosure.

What is claimed is:

1. An improvement for use in a high voltage supply of the type wherein a high output voltage is applied to a load connected to a secondary winding of a step-up transformer by repetitively actuating a switching element connected between a primary of the transformer and a lower voltage power source, said improvements comprising a main primary winding having a first resistance to inductance ratio wound about a magnetic core, and an auxiliary primary winding having a second resistance to inductance ratio different from said first resistance to inductance ratio also wound about said core, said main and auxiliary windings being connected together in parallel to form said primary of the transformer whereby transient counter emf currents in said main and auxiliary windings tend to cancel each other within the transformer thus preventing transient spurious switch operations otherwise caused by counter emf voltages.

2. An improvement as in claim 1 wherein said supply includes an RC time constant circuit for repetitively actuating said switching element, said improvement further comprising means for detecting a reverse polarity voltage across a capacitor of said RC time constant circuit as a signal representative of the occurrence of an abnormal condition, and control means connected to said means for detecting for generating a control signal in response to detection of said reverse polarity voltage for interrupting the supply of voltage to the primary of the transformer.

3. An improvement as in claim 2 wherein said means for detecting comprises a further RC time constant circuit effectively connected in series with a diode across said capacitor to cause charging of said further RC time constant circuit when reverse polarity voltages appear thereacross.

4. An improvement as in claim 2 wherein said control means comprises a silicon controlled rectifier having annode, cathode and trigger terminals, with its trigger terminal connected to said means for detecting.

5. An improvement as in claim 4 wherein said cathode and annode terminals of said silicon controlled rectifier are effectively connected across the lower voltage power source.

6. An improvement as in claim 1 wherein said switching element comprises a semiconductor device.

7. An improvement as in claim 1 further comprising an output circuit including a series connection of the secondary winding, an output rectifier and an output capacitor, and output terminals connected across said output rectifier for supplying said high output voltage to a load whereby the net output voltage is increased by the voltage appearing across the output capacitor.

8. An improved high voltage supply for producing a high output voltage from a lower voltage input, said improved supply comprising a main primary winding wound about a magnetically permeable core, an auxiliary primary winding also wound about said core, said main and auxiliary windings being connected together in parallel to form a composite transformer primary whereby counter emf currents in said main and auxiliary windings tend to cancel each other, switch means connected in series with said transformer primary and an input terminal adapted to connect to said lower voltage input, or automatically pulsing current through said transformer primary, a secondary winding also wound about said core for magnetically coupling to said transformer primary and for providing stepped-up high voltage output pulses, and an output circuit including at least one rectifier element for rectifying said high voltage output pulses to provide said high output voltage.

9. An improved high voltage supply as in claim 8 further comprising an RC time constant circuit for repetitively actuating said switch means, means for detecting a reverse polarity voltage across a capacitor of said RC time constant circuit as a signal representative of the occurrence of an abnormal condition, and control means connected to said means for detecting for generating a control signal in response to detection of said reverse polarity voltage for interrupting the supply of voltage to the primary windings of the transformer.

10. An improved high voltage supply as in claim 8 wherein said output circuit comprises an output rectifier and an output capacitor connected in series with said secondary winding, and output terminals connected across said output rectifier for supplying said high output voltage to a load whereby the net output voltage is increased by the voltage appearing across the output capacitor.

11. An improved high voltage supply for producing a high output voltage from a lower voltage input, said improved supply comprising a primary winding wound about a magnetically permeable core, switch means connected in series with said primary winding for passing current to said primary winding when in a closed state, an RC time constant circuit connected to said switch means for automatically and repetitively operating said switch means thereby causing current pulses in said primary winding, means for detecting a reverse polarity voltage across a capacitor of said RC time constant circuit as a signal representative of the occurrence of an abnormal condition, control means connected to said means for detecting for generating a control signal in response to detection of said reverse polarity voltage, a secondary winding wound about said core for magnetically coupling to said primary winding and for providing stepped-up high voltage output pulses in response to said current pulses in said primary winding, and an output circuit connected to said secondary winding for rectifying said high voltage output pulses to provide said high output voltage for interrupting the supply of voltage to the primary winding.

12. An improved high voltage supply as in claim 11 wherein said control means comprises a silicon controlled rectifier having a trigger electrode connected to said means for detecting and an anode and cathode terminals effectively shunted across said primary winding.

13. An improved high voltage supply as in claim 12 wherein said means for detecting comprises a further RC time constant circuit effectively connected in series with a diode across said capacitor to cause charging of said further RC time constant circuit when reverse polarity voltages appear thereacross.

14. An improved high voltage supply as in claim 13 wherein said output circuit comprises an output rectifier and an output capacitor effectively connected in series with said secondary winding, and output terminals connected across said output diode for supplying said high output voltage to a load whereby the net output voltage is increased by the voltage appearing across the output capacitor.

15. A circuit adapted for use in an electrographic copy machine to generate high frequency, large amplitude pulses which produce a corona discharge needed in such a copy machine, said pulses being produced from a low frequency, low amplitude electrical source, comprising a first resistor and a first capacitor interconnected in series and across said source, a protective circuit connected in parallel with said capacitor, a transformer having main-primary, auxiliary-primary, and secondary windings, said primary windings having different resistance to inductance ratio and being connected in parallel, in opposing senses, a semiconductive switching device connected in series with said primary windings, said semi-conductive device primary winding connection also being connected across said capacitor, a second capacitor and a first diode interconnected in series with said secondary winding, said high-frequency large amplitude pulses being produced across said diode, said protective circuit including a pair of divider resistors and a second diode interconnected in series and across said first capacitor, a third capacitor and a third diode interconnected in series and also connected in series with one of said divider resistors and said second diode, said interconnected third capacitor and third diode being connected in parallel with the other of said divider resistors, and a controlled rectifier having an anode, cathode and gate terminal, said gate terminal being connected to the said third capacitor and said third diode, and said anode and cathode being connected across said first capacitor.

16. A circuit adapted for use in an electrographic copy machine to generate high frequency, large amplitude pulses which produce a corona discharge needed in such a copy machine, said pulses being produced from a low frequency, low amplitude electrical source, comprising a first resistor and a first capacitor interconnected in series and across said source, a protective circuit connected in parallel with said capacitor, a transformer having main-primary, auxiliary-primary, and secondary windings, said primary windings having different resistance to inductance ratio and being connected in parallel in opposing senses a semi-conductive switching device connected in series with said primary windings, said semi-conductive device primary winding connection also being connected across said capacitor, a second capacitor and a first diode interconnected in series with said secondary winding, and forming an output circuit for said high-frequency large amplitude pulses, said protective circuit including a pair of divider resistors and a second diode interconnected in series and across said first capacitor, a third capacitor and a third diode interconnected in series and also connected in series with one of said divider resistors and said second diode, said interconnected third capacitor and third diode being connected in parallel with the other of said divider resistors, and a controlled rectifier having an anode, cathode and gate terminal, said gate terminal being connected to the common point of said third capacitor and said third diode, and said anode and cathode being connected across said first capacitor.

17. An improved high voltage supply as in claim 1 wherein the size of the wire forming the main primary winding is greater than the size of the wire forming the auxiliary primary winding.

* * * * *